United States Patent [19]

Will et al.

[11] 4,355,550
[45] Oct. 26, 1982

[54] TORQUE CONTROL FOR INTERNAL COMBUSTION ENGINES

[75] Inventors: Gerhard Will, Steinheim; Walter Stroh, Cleebronn; Martin Zechnall, Schwieberdingen, all of Fed. Rep. of Germany

[73] Assignee: Robert Bosch GmbH, Stuttgart, Fed. Rep. of Germany

[21] Appl. No.: 80,005

[22] Filed: Sep. 28, 1979

[30] Foreign Application Priority Data

Sep. 29, 1978 [DE] Fed. Rep. of Germany ....... 2842389

[51] Int. Cl.³ .................. B60K 41/06; F02D 5/00; F02D 13/02
[52] U.S. Cl. ........................ 74/872; 74/858; 74/866; 74/874
[58] Field of Search ............ 74/872, 874, 866, 858, 74/851, 852, 859, 860; 192/0.052, 0.034, 0.08

[56] References Cited

U.S. PATENT DOCUMENTS

| | | | |
|---|---|---|---|
| 2,387,891 | 10/1945 | Elkin | 74/851 |
| 2,673,474 | 3/1954 | Boyce | 74/860 X |
| 3,327,553 | 6/1967 | Peras | 74/852 X |
| 3,548,980 | 12/1970 | Schmidt et al. | 74/872 X |
| 3,667,577 | 6/1972 | Weymann | 74/858 X |
| 3,750,495 | 8/1973 | Ito et al. | 74/866 |
| 3,763,720 | 10/1973 | Aono et al. | 74/866 X |
| 3,792,630 | 2/1974 | Hause | 74/851 X |
| 3,814,224 | 6/1974 | Podssuweit | 74/858 X |
| 3,939,738 | 2/1976 | Adey et al. | 74/859 |
| 4,200,007 | 4/1980 | Espenschied et al. | 74/872 X |
| 4,223,573 | 9/1980 | Franssen | 74/858 |
| 4,226,141 | 10/1980 | Espenschied | 74/858 |
| 4,228,700 | 10/1980 | Espenschied et al. | 74/866 |

FOREIGN PATENT DOCUMENTS

| | | | |
|---|---|---|---|
| 1080415 | 10/1960 | Fed. Rep. of Germany . | |
| 1626427 | 9/1971 | Fed. Rep. of Germany . | |
| 1480177 | 6/1975 | Fed. Rep. of Germany . | |
| 2163979 | 5/1978 | Fed. Rep. of Germany . | |
| 2109620 | 7/1978 | Fed. Rep. of Germany . | |
| 2726377 | 12/1978 | Fed. Rep. of Germany | 74/866 |
| 2805544 | 8/1979 | Fed. Rep. of Germany . | |
| 2806979 | 8/1979 | Fed. Rep. of Germany | 74/866 |
| 1524354 | 5/1968 | France . | |
| 2018917 | 10/1979 | United Kingdom | 74/858 |

Primary Examiner—Rodney H. Bonck
Attorney, Agent, or Firm—Frishauf, Holtz, Goodman & Woodward

[57] ABSTRACT

In order to diminish the lurching which occurs when automatic transmissions of motor vehicles perform gear changes, the invention describes apparatus for gradual changes of the engine torque at or near the onset of the gear change as well as at or near the time of gear reengagement. The engine torque may be changed by altering the fuel metering characteristics and/or the ignition timing in a gradual and controlled manner.

11 Claims, 4 Drawing Figures

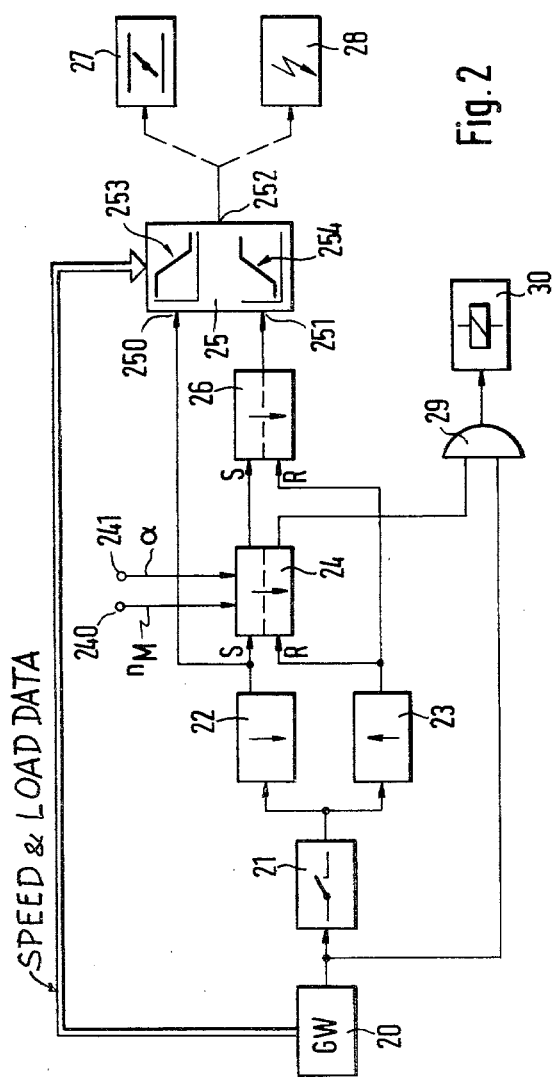
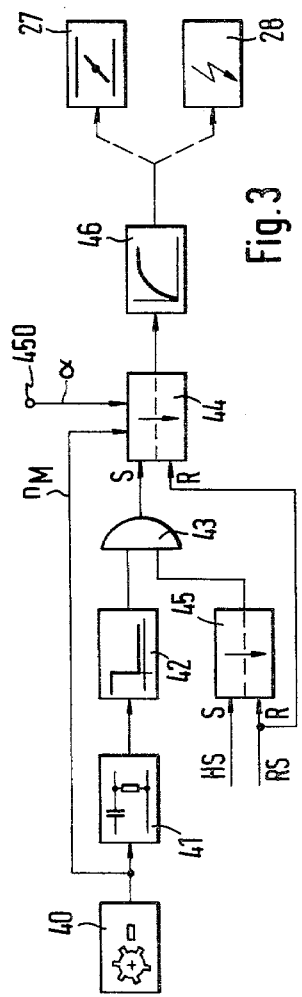

TORQUE CONTROL FOR INTERNAL COMBUSTION ENGINES

FIELD OF THE INVENTION

The invention relates to internal combustion engines for motor vehicles. More particularly, the invention relates to an apparatus for smoothing out the shifting characteristics of a motor vehicle equipped with an automatic transmission by suitable temporary changes in the operational engine variables and a corresponding transitional torque control.

BACKGROUND OF THE INVENTION AND PRIOR ART

Apparatus for applying temporary engine control measures to reduce the lurch or jolt during gearshifts of automatic transmissions is known from a number of prior art publications.

In the British Pat. No. 929,621 there is described, for example, an apparatus which performs a temporary closure of the throttle valve under the control of signals generated by monostable multivibrators.

German Pat. No. 10 80 415 describes a control system for automatic transmissions in the form of a control cam which is mechanically coupled to a switch that actuates a relay and a solenoid for moving either the throttle valve of the engine or engaging the ignition system.

German Pat. No. 1 480 177 describes an apparatus wherein a control signal causes electromechanical actuation of a latch which blocks the supply of fuel during the gearshift until such time as the gears are again running in synchronism.

German Pat. No. 16 26 427 makes known a system for reducing the engine speed during gear changes of the automatic transmission by a change in the ignition timing. In particular, the ignition is retarded during the gear changes.

French Pat. No. 1 524 354 describes an apparatus in which a timing member interrupts the fuel injection to the engine for a predetermined period of time during gearshift.

Similarly, the German Pat. No. 21 09 620 describes a system in which a solenoid is actuated at some time after the initiation of the gearshift for interrupting fuel injection.

German Pat. No. 21 63 979 describes a system differentiating the upshift signal of the automatic transmission and applying the differentiated signal to a computer circuit which reduces the width, i.e., duration, of the injection pulses during the gearshift.

Finally, it has been proposed in the German published application No. 28 05 544.9 to generate transition functions for actuating the friction components of an automatic transmission in which the slope and polarity of the transition functions depend on the type of shift which is undertaken, i.e., load or no-load, up or down shift, etc.

It is a common disadvantage of all of the aforementioned systems for reducing the engine torque during a gearshift that the control variable which is used to alter the fuel metering or, in other cases, the ignition characteristics of the engine, is abruptly changed at the occurrence of a gear-shift control signal. Accordingly, the engine torque is also changed abruptly. The consequence of this common failing is that the desired goal, namely the reduction of the lurch which the vehicle undergoes during a gearshift, is not reached by the prior art systems. Furthermore, the desired reduction of wear and tear of the frictional bands in the automatic transmission is also not fully attained.

THE INVENTION

It is thus a principal object of the present invention to provide an apparatus for temporary control of the torque of an internal combustion engine during gear changes of the associated vehicle and by which the vehicle lurch during gearshifts is substantially reduced and the wear and tear of the friction elements, i.e., clutches, bands, etc., of the automatic transmission is sharply reduced. This object is attained according to the invention by providing that the engine torque is reduced gradually at or near the time of the beginning of the gearshift and is reestablished gradually at or near the time of the termination of the gearshift cycle. The manner in which the engine torque is reduced depends on a time function which is applied to the engine variable used to control the engine torque, for example the fuel metering and/or the ignition timing.

In a favorable feature of the invention, the engine torque is reduced prior to the disengagement of the previous gear and the disengagement takes place only after the engine speed has fallen to a given value, in particular a given fraction of its former value. The amount of time prior to the gear disengagement during which the engine torque is reduced may be made dependent on the engine speed and/or engine load.

In one preferred embodiment of the invention, a function generator stores transition functions having positive as well as negative slopes which are selected according to whether the transmission undergoes an upshift or, a downshift and also depending on whether or not the engine is operating under load.

Other features and characteristics of the invention will emerge from the detailed description of two preferred embodiments described with reference to the drawing.

THE DRAWING

FIG. 2 is a schematic block diagram of a first embodiment of the apparatus of the present invention; and FIG. 3 is a schematic block diagram of a second embodiment of the apparatus according to the present invention.

DESCRIPTION OF THE PREFERRED EMBODIMENTS

Figure 1A:
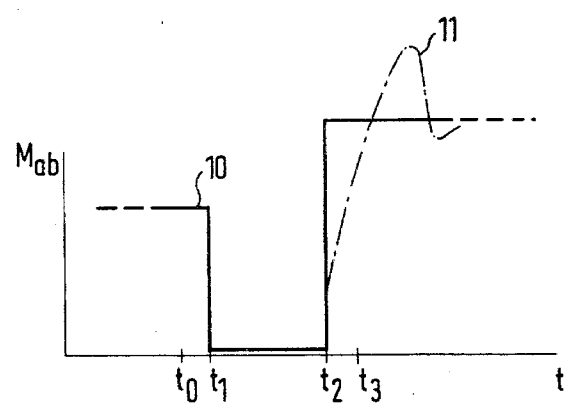
FIG. 1a is a diagram illustrating the transmission output torque as a function of time during gearshifts in a vehicle having a known jolt control system.

When the automatic transmission of the motor vehicle is shifted between two gears, a sudden torque change takes place at the transmission output. This change is illustrated in the diagram of FIG. 1a for the case of a downshift, i.e., a shift from a high gear to a lower gear. During operation at the higher gear, the engine torque $M_{ab}$ has the constant value illustrated by the line 10. At the time $t_1$, the prevailing gear is disengaged and the torque delivered to the vehicle drops to zero. At the time $t_2$, the new (lower) gear is engaged and the delivered torque rises abruptly to a value higher than the previous value of line 10. In practice however, it is virtually impossible to abruptly attain a new constant value and there will normally occur a substantial amount of overshoot, illustrated schematically by the dash-dotted line 11. It is due principally to this overshoot that the vehicle and the occupants experience the very unpleasant lurch when the new gear is engaged. In order to reduce the lurching effect, i.e., the overshoot of the output torque, it has been proposed to reduce the engine torque for a given period of time by interrupting the fuel supply or by changing the ignition timing in the direction of late ignition. The fuel supply may be interrupted, for example, by closing the throttle valve, cycling the fuel injection or reducing the width of the fuel injection control pulse.

Figure 1B:
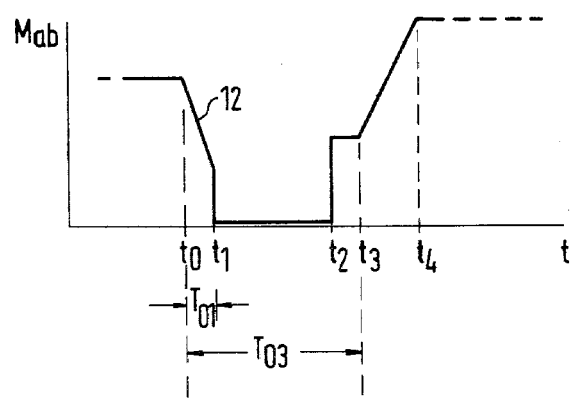
FIG. 1b is a singular diagram for a vehicle equipped with a system according to the invention.

Any or all of the aforementioned methods may be employed in the apparatus of the invention. It is the distinguishing characteristic of the apparatus of the invention that the torque reduction during the gearshift takes place gradually, due to the fact that the changes in engine characteristics, i.e., the change in fuel supply or the alteration of the ignition timing, takes place in accordance with a well-defined and predetermined characteristic curve as a function of time so as to prevent the objectionable sudden collapse and reestablishment of torque $M_{ab}$. This improved characteristic is illustrated in FIG. 1$b$ in which the delivered torque $M_{ab}$ is shown to be gradually reduced while the transmission gear is still engaged, i.e., prior to the time $t_1$, at a time $t_0$. During the time $T_{01}$ the torque is gradually reduced along the curve 12 until the disengagement of the gear at the point $t_1$ reduces the torque to zero. At a time $t_2$, the transmission engages the new gear and the torque rises abruptly to a finite value which is substantially lower than the previous constant torque and has a value which is in the same proportion to the reduced torque at the time $t_1$ as the torque in the reduced gear will finally be to the torque in the previous higher gear. At the time $t_3$, the torque is increased according to a predetermined transition function up to a time $t_4$ at which it reaches its final value.

A schematic circuit diagram of an apparatus for performing the gradual control described above is shown in FIG. 2 in a first embodiment. A gear selection indicator 20 as i.e. described in the U.S. Pat. No. 3,826,158 or 4,038,889, coupled via a switch 21, is connected to the inputs of a downshift detector 22 and an upshift detector 23 which can be realized as differentiating circuits with rectifiers. The output of the downshift detector 22 is connected to the set input of a first timing member 24 while the output of the upshift detector 23 is connected to the reset input of the timing member 24. The timing member 24 has further inputs 240, 241, to which are applied, respectively, sensor signals related to engine speed $n_M$ and engine load $\alpha$ for the purpose of changing the timing constant of the first timing member 24. The engine speed signal $n_M$ and the load signal $\alpha$ may be generated by well known sensors, not further described or illustrated.

The output of the downshift detector 22 is further connected to the first input 250 of a function generator 25 which is capable of generating, for example, a ramp function with a negative slope upon the receipt of a signal on the input 250. A second input 251 of the function generator 25 is connected to the output of a second timing member 26 for initiating the generation of a ramp-type function 254 with positive slope. The set input of the second timing member 26 is connected to one output of the first timing member 24 while the reset input of the second timing member 26 is connected to the signal output of the upshift detector 23. A data connection exists between the gearshift selection circuit 20 and a data input of the function generator 25 to provide gear selection information thereto. The output 252 of the function generator 25 carries a control signal which may be temporarily applied to one or more of the various engine control systems, for example the throttle valve 27, and/or the ignition system 28. The output of the gear selector circuit 20 is also applied to one input of an AND gate 29, the other input of which is connected to one output of the first timing member 24. The AND gate 29 controls the actuation of a solenoid valve 30 which is connected to the transmission and causes the disengagement of the prevailing gear.

The schematic illustration of the first embodiment of the invention to FIG. 2 relates only to the operation during shifts to a lower gear. However, the principles to be discussed in connection with this diagram apply also to upshifts, i.e., changes to a higher gear, with suitable change of components to obtain the desired characteristics for upshifts. As illustrated in FIG. 2, the gear selector circuit 20 generates a control signal which is applied to the shift detectors 22, 23 via the switch 21 which may be used to activate the entire system for reducing engine torque only when desired, for example, during what might be called a maximum comfort program. At other times, for example during high performance operation of the engine, the switch 21 can be opened to suppress the operation of the system. The shift detector circuits 22,23 determine if the shift being contemplated is an upshift or a downshift. If the downshift signal is obtained, the first timing member 24 is started and the first input 250 of the function generator 25 is activated. Accordingly, a ramp function with a negative slope is applied to, for example, the fuel metering system 27 and/or the ignition system 28, thereby gradually reducing engine torque in accordance with the function 253. After the time constant of the first timing member 24 has expired, the AND gate 29 is opened, thereby causing the solenoid valve 30 to disengage the prevailing gear. The time constant of the first timing member 24 is equal to the time $T_{01}$ in FIG. 1$b$. Accordingly, the engine torque is gradually reduced prior to disengagement of the prevailing gear. The output signal from the first timing member 24 also triggers the second timing member 26 so that after a predetermined second time interval, a control signal appears at the second input 251 of the function generator 25, causing the output 252 to switch over from a transition function 253 having negative slope to a transition function 254 having positive slope. When this signal is applied to the appropriate control elements 27 and/or 28, the engine torque is gradually increased. The sum of the time constants of the timing members 24, 26 is equal to the time $T_{03}$ in FIG. 1$b$. In the system illustrated in FIG. 2, a response by the upshift detector 23, i.e., a recognition of an impending change to a higher gear, causes the timing members 24, 26 to be immediately reset so that no change of engine torque takes place. On the basis of the data supplied by the gear selection circuit 20 to the ramp or fuction generator 25, it is possible to determine if the gearshift is taking place under load or no load conditions. The outcome of this determination may be used to alter the algebraic sign of the slope in the transition functions 253, 254. The apparatus illustrated in FIG. 2 may also be modified without difficulty to perform a selective response depending on upshift, downshift, load or no load. In that case, the upshift detector 23 would be eliminated so that the timing members 24, 26 respond to both up and down shifts.

A second, simplified embodiment of the invention is shown in the block diagram of FIG. 3. A tachometer 40 generates a signal which is applied to a differentiating member 41 and thereafter to a comparator 42 which feeds the first input of an AND gate 43, the second input thereof being connected to the output of a timing member 45. The set and reset inputs of the timing member 45 are connected, respectively, to receive upshift and downshift signals. The output of the AND gate 43 is connected to the set input of a further timing member 44 which also receives the tachometer signal $n_M$ and an engine load signal from a contact 450 for the purpose of altering the time constant. The output of the timing member 44 is passed through a delay circuit 46 whose output is then used to engage the fuel metering system 27 and/or the ignition timing 28, as was the case in the embodiment of FIG. 2.

The second embodiment illustrated in FIG. 3 has been illustrated for the case of a response during an upshift, i.e., when a change to a higher gear occurs. However, by suitable charge of the elements of the apparatus, considered well within the competence of the person skilled in the art, the system may be easily adapted to respond to downshifts. The system of FIG. 3 functions as follows. When an upshift signal HS occurs, the timing member 45 is triggered. At the expiration of its time constant, it applies an enabling signal to the AND gate 43. If the gate 43 also receives an enabling signal from the comparator 42, i.e., indicating that the engine speed has decreased, the timing member 44 is triggered and, for a period of time equal to its time constant, the fuel metering system 27 and/or the ignition system 28 are operated according to a time function which is gradual and is determined by the characteristics of the delay element 46. When a downshift signal RS occurs, both timing members 44 and 45 are immediately reset and the engine torque is unchanged. As was the case in the embodiment of FIG. 2, the time constant of the timing member 44 is variable in dependence on engine speed and load. For example, the time constant of the timing member 44 may be so adjusted as to be zero up to an engine speed of, for example, 3000 rpm and thereafter to increase linearly or in some other selectable manner.

The foregoing description relates to preferred embodiments of the invention. However, many variations of operation and circuit changes will be obvious to one skilled in the art and are intended to be encompassed by the following claims.

We claim:

1. In a drive system having an internal combustion engine, an automatic transmission having an input coupled to said internal combustion engine and an output, and a load coupled to said output of said automatic transmission, apparatus for controlling the torque of said internal combustion engine during shifting from a prevailing gear to a subsequent gear, comprising means for generating a gear selection signal;

function generator means (25) having a first input (250) connected to said gear selection signal generator means for generating a control signal gradually changing the torque of said internal combustion engine as a predetermined function of time, and a second input;

first timing means (24) connected to said gear selection signal generator means for generating a first timing signal in response to said gear selection signal;

means (30) connected to said first timing means for disengaging said prevailing gear in response to said first timing signal; and second timing means (26) having an input connected to said first timing means and an output connected to said second input of said function generator means.

2. Apparatus according to claim 1, wherein said function generator means generates a first function having a negative slope in response to a signal at said first input and a second function having a positive slope in response to a signal at said second input; and wherein said function generator means further controls the polarity of said function in dependence upon the direction of gear shift.

3. Apparatus for controlling the torque of a drive system comprising an internal combustion engine and an automatic transmission coupled to said internal combustion engine during shifting from a prevailing gear to a subsequent gear, comprising means (30) for disengaging said prevailing gear;

means for gradually changing the output torque of said engine as a ramp function of time during said gear shifts; and circuit means (24, 29) for delaying operation of said disengaging means until after the start of operation of said torque-changing means.

4. Apparatus according to claim 3, further comprising means for generating a shift direction signal (HS) indicative of the desired direction of gear shift;

wherein when said output torque changing means comprises output elements operating in accordance with a torque signal applied thereto, and delay means (46) interconnected between said output elements (27, 28) and said shift direction signal generating means for generating a torque control signal varying as said predetermined function of time in response to a shift direction signal indicative of a predetermined shift direction.

5. Apparatus according to claim 4 further comprising a timing member (44) interconnected between said shift direction signal generating means and said delay means for controlling the operating time of said delay means.

6. Apparatus according to claim 5, further comprising means (40–42) for generating a speed signal indicative of decreased engine speed and logic circuit means (43) connected to said speed signal furnishing means, said shift direction signal generating means and said timing member for preventing operation of said timing member in the absence of said speed signal.

7. In a drive system having an internal combustion engine, an automatic transmission having an input coupled to said internal combustion engine, and an output, apparatus for controlling the torque of said internal combustion engine during shifting from a prevailing gear to a subsequent gear comprising means for generating a gear selection signal;

function generator means (25) having a first input (250) connected to said gear selection signal generator means for generating a control signal gradually changing the torque of said internal combustion engine as a predetermined function of time;

first timing means (24) connected to said gear selection signal generator means for generating a first timing signal in response to said gear selection signal;

means connected to said first timing means for disengaging said prevailing gear in response to said first timing signal;

and means for changing the time constant of said first timing means (24) in dependence on at least one of the variables: engine speed; engine load.

8. Apparatus for controlling the torque of a drive system having an internal combustion engine and an automatic transmission coupled to said internal combustion engine during shifting from a prevailing gear to a subsequent gear, comprising means (30) for disengaging said prevailing gear;

means for gradually changing the output torque of said engine as a predetermined function of time during said gear shift;

a timing member (44), the input of which is connected to receive a signal related to gear selection;

a delay circuit (46), connected to the output of said timing member, the output from said delay circuit (46) providing a control signal for changing engine operation;

and means (450) for changing the time constant of said timing member (44) in dependence on at least one of the parameters: engine speed; engine load.

9. Apparatus for controlling the torque of a drive system having an internal combustion engine and an automatic transmission coupled to said internal combustion engine during shifting from a prevailing gear to a subsequent gear, comprising means (30) for disengaging said prevailing gear;

means for gradually changing the output torque of said engine as a predetermined function of timing during said gear shift;

circuit means for delaying operation of said disengaging means until after the start of operation of said torque-changing means;

means for generating a shift direction signal (HS) indicative of the desired direction of gear shift;

output elements on said output torque changing means operating in accordance with a torque signal applied to said output torque changing means;

and delay means (46) interconnected between said output elements and said shift direction signal generating means for generating a torque control signal varying as said predetermined function of time in response to a shift direction signal indicative of a predetermined shift direction.

10. Drive system according to claim 3, or 7, or 8, or 9, wherein said torque changing means comprises means for changing the fuel metering of said engine.

11. Drive system according to claim 3, or 7, or 8, or 9, wherein said torque changing means comprises means for changing the ignition timing of said engine.

* * * * *